(12) United States Patent
Morales et al.

(10) Patent No.: US 11,689,635 B2
(45) Date of Patent: Jun. 27, 2023

(54) SYSTEMS AND METHODS FOR A CROSS-SITE OPT-IN NETWORK

(71) Applicant: Carvana, LLC, Tempe, AZ (US)

(72) Inventors: Kirk Morales, Phoenix, AZ (US); Gregory Lim, Scottsdale, AZ (US)

(73) Assignee: Carvana, LLC, Tempe, AZ (US)

( * ) Notice: Subject to any disclaimer, the term of this patent is extended or adjusted under 35 U.S.C. 154(b) by 0 days.

(21) Appl. No.: 17/534,016

(22) Filed: Nov. 23, 2021

(65) Prior Publication Data

US 2022/0166843 A1 May 26, 2022

Related U.S. Application Data

(60) Provisional application No. 63/117,134, filed on Nov. 23, 2020.

(51) Int. Cl.
*H04L 67/567* (2022.01)
*H04L 67/146* (2022.01)
*G06Q 30/0251* (2023.01)
*H04L 67/563* (2022.01)
*H04L 67/566* (2022.01)

(52) U.S. Cl.
CPC ....... *H04L 67/567* (2022.05); *G06Q 30/0255* (2013.01); *H04L 67/146* (2013.01); *H04L 67/563* (2022.05); *H04L 67/566* (2022.05)

(58) Field of Classification Search
CPC ... H04L 67/567; H04L 67/146; H04L 67/563; H04L 67/566; G06Q 30/0255
See application file for complete search history.

(56) References Cited

U.S. PATENT DOCUMENTS

| | | |
|---|---|---|
| 8,131,861 B2 | 3/2012 | Butler et al. |
| 8,560,669 B2 | 10/2013 | Sutter et al. |
| 8,898,074 B2 | 11/2014 | Doughty et al. |
| 9,112,850 B1 | 8/2015 | Eisen |
| 9,313,294 B2 | 4/2016 | Perez et al. |
| 10,091,312 B1 | 10/2018 | Khanwalkar et al. |

(Continued)

OTHER PUBLICATIONS

The Web Never Forgets: Persistent Tracking Mechanisms in the Wild Author(s): Gunes Acar, Christian Eubank, Steven Englehardt, Marc Juarez, Arvind Narayanan, Claudia Diaz Publisher: CCS '14: Proceedings of the 2014 ACM SIGSAC Conference on Computer and Communications Security Publication Date: Nov. 2014.

*Primary Examiner* — Joe Chacko
(74) *Attorney, Agent, or Firm* — The Marbury Law Group, PLLC (57) ABSTRACT

A method for tracking a user across multiple website domains over a computerized network, the method comprising sending a first first-party user identifier to a collector in response to a user accessing a first website; generating a first user prompt in response to the user accessing the first website; receiving a first input from the user in response to the first user prompt; redirecting the user to a centralized domain; sending a second first-party user identifier associated with the user and the centralized domain to the collector; correlating the first first-party user identifier with the second first-party user identifier to determine that the user is associated with both the first first-party user identifier and the second first-party user identifier; and displaying a webpage of the centralized domain or a landing page in response to the correlation.

18 Claims, 2 Drawing Sheets

(56) References Cited

U.S. PATENT DOCUMENTS

| | | |
|---|---|---|
| 10,193,882 B2 | 1/2019 | Benguerah et al. |
| 10,387,923 B2 | 8/2019 | Wang et al. |
| 10,567,529 B2 * | 2/2020 | Falkenburg ............ H04L 67/146 |
| 10,817,903 B2 | 10/2020 | Demsey et al. |
| 2003/0037131 A1 | 2/2003 | Verma |
| 2014/0006158 A1 * | 1/2014 | Cooper .................. G06Q 30/02 |
| | | 705/14.56 |
| 2014/0244401 A1 * | 8/2014 | Doughty ............ G06Q 30/0261 |
| | | 705/14.66 |
| 2017/0085522 A1 | 3/2017 | Greene |
| 2017/0359337 A1 * | 12/2017 | Benguerah .............. H04L 63/08 |
| 2020/0236569 A1 * | 7/2020 | Manolarakis ...... G06Q 30/0251 |
| 2020/0342473 A1 | 10/2020 | Vanderhook |

* cited by examiner

FIGURE 1

Method A

FIGURE 2
100

SYSTEMS AND METHODS FOR A CROSS-SITE OPT-IN NETWORK

CROSS REFERENCE TO RELATED APPLICATIONS

This application claims priority to U.S. Provisional No. 63/117,134 to Kirk Morales, entitled "Systems and Methods for a Cross-Site Opt-In Network" filed on Nov. 23, 2020.

BACKGROUND

1. Field of the Invention

This disclosure relates to systems, methods, devices, and other approaches to tracking Internet users across multiple domains in a network. In particular, various embodiments may provide a system and method for tracking internet users across multiple domains in a network utilizing an opt-in framework and defaulting to first party cookies.

2. Description of Related Art

With ever-increasing user privacy regulations and third party cookies being blocked automatically in many browsers, websites need a secure, consent-based method of tracking their users across domains. Historically, websites and third party services use third party cookies in browsers to track a unique user across domains, requiring an "opt-out" approach where the user must know this is happening and explicitly block the activity from happening.

SUMMARY

Implementations of a computing system for tracking a user across multiple website domains over a computerized network may comprise one or more hardware computer processors; and one or more storage devices configured to store software instructions executable by the one or more hardware computer processors to cause the computing system to: send a first first-party user identifier to a collector in response to a user accessing a first website; generate a first user prompt in response to the user accessing the first website; receive a first input from the user in response to the first user prompt; redirect the user to a centralized domain; send a second first-party user identifier associated with the user and the centralized domain to the collector; correlate the first first-party user identifier with the second first-party user identifier to determine that the user is associated with both the first first-party user identifier and the second first-party user identifier; and display a webpage of the centralized domain or a landing page in response to the correlation.

Particular aspects may comprise one or more of the following features. The first first-party user identifier may comprise at least one of: information about a web browser used by the user; a user identity for the user associated with the first website; an IP address of the user; a user-agent of the web browser of the user; a webpage visited by the user; a query parameter in a URL visited by the user; a domain visited by the user; and a code that is unique to at least one of the user and a current web browsing session of the user. The user prompt may comprise at least one of: an authentication link that prompts the user to log into a user account on the first website; a request for the user to accept one or more cookies; a pop-up modal, tab, or window that prompts the user to join a newsletter or mailing list; a pop-up modal, tab, or window that prompts the user to join a community on the first website; a link that prompts the user to complete a common action on the first; and a pop-up modal, tab, or window that offers the user a promotional offer or other discount code in response to the user providing the first input.

The first user input may comprise at least one of: an affirmative input or action by the user to accept one or more cookies; an affirmative input or action by the user to join a newsletter or a mailing list; an affirmative input or action by the user to join a community; an affirmative input or action by the user to begin a prompted process; an email address of the user; a click of "yes" in response to the first user prompt; and a closing of the pop-up window of the first user prompt.

The one or more storage devices may be further configured to store software instructions executable by the one or more hardware computer processors to cause the computing system to generate a second user prompt after the user is redirected to the centralized domain and receive a second input from the user in response to the second user prompt. The one or more storage devices may be further configured to store software instructions executable by the one or more hardware computer processors to cause the computing system to redirect the user back to the first website. The one or more storage devices may be further configured to store software instructions executable by the one or more hardware computer processors to cause the computing system to determine by the collector whether there is an active user having an ability to opt into the computerized network via a user prompt by sending one or more requests to the collector at predetermined intervals of time.

The one or more requests sent to the collector may comprise at least one of: a code associated with the user or a web browsing session of the user; information about a web browser used by the user; an IP address of a computerized device used by the user; and a unique identifier associated with the user. The one or more requests sent to the collector may comprise an indication that the user has chosen not to respond to the first user prompt in response to a dismissal of the first user prompt by the user. The one or more storage devices may be further configured to store software instructions executable by the one or more hardware computer processors to cause the computing system to display a different user prompt when the user next visits the first website in response to the first user input or the prior abandonment of the first user prompt by the user.

Implementations of a method for tracking a user across multiple website domains over a computerized network may comprise: sending a first first-party user identifier to a collector in response to a user accessing a first website; generating a first user prompt in response to the user accessing the first website; receiving a first input from the user in response to the first user prompt; redirecting the user to a centralized domain; sending a second first-party user identifier associated with the user and the centralized domain to the collector; correlating the first first-party user identifier with the second first-party user identifier to determine that the user is associated with both the first first-party user identifier and the second first-party user identifier; and displaying a webpage of the centralized domain or a landing page in response to the correlation.

Particular aspects may comprise one or more of the following features. The first first-party user identifier may comprise at least one of: information about a web browser used by the user; a user identity for the user associated with the first website; an IP address of the user; a user-agent of the web browser of the user; a webpage visited by the user; a query parameter in a URL visited by the user; a domain visited by the user; and a code that is unique to at least one of the user and a current web browsing session of the user. The user prompt may comprise at least one of: an authentication link that prompts the user to log into a user account on the first website; a request for the user to accept one or more cookies; a pop-up modal, tab, or window that prompts the user to join a newsletter or mailing list; a pop-up modal, tab, or window that prompts the user to join a community on the first website; a link that prompts the user to complete a common action on the first; and a pop-up modal, tab, or window that offers the user a promotional offer or other discount code in response to the user providing the first input.

The first user input may comprise at least one of: an affirmative input or action by the user to accept one or more cookies; an affirmative input or action by the user to join a newsletter or a mailing list; an affirmative input or action by the user to join a community; an affirmative input or action by the user to begin a prompted process an email address of the user; a click of "yes" in response to the first user prompt; and a closing of the pop-up window of the first user prompt. The method may further comprise generating a second user prompt after the user is redirected to the centralized domain and receiving a second input from the user in response to the second user prompt.

The method may further comprise redirecting the user back to the first website. The method may further comprise determining by the collector whether there is an active user having an ability to opt into the computerized network via a user prompt by sending one or more requests to the collector at predetermined intervals of time. The one or more requests sent to the collector may comprise at least one of: a code associated with the user or a web browsing session of the user; information about a web browser used by the user; an IP address of a computerized device used by the user; and a unique identifier associated with the user.

The one or more requests sent to the collector may comprise an indication that the user has chosen not to respond to the first user prompt in response to a dismissal of the first user prompt by the user. The method may further comprise displaying a different user prompt when the user next visits the first website in response to the first user input or the prior abandonment of the first user prompt by the user.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or Claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION, DRAWINGS, and CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

The first-party cross-site network is intended to allow for the tracking of Internet users across multiple domains in this network utilizing an opt-in framework and defaulting to first-party cookies.

The user flow includes specifics about interactions with the Collector Service (the "Collector"), described later in this document.

The terminology "brand" or "brand site" indicates any client, customer, or partner that uses a tracking code or library (e.g., for non-web browser use cases) and is part of the network.

The terminology "multiple domains" or "domain" means any Internet domain, brand website, platform (e.g., iOS®, Android®, AppleTV®, Roku®), Internet-enabled device, application (e.g., an application on a smart phone or other computerized device), or channel.

The terminology "cookie" means any type of browser storage, local storage, browser cookie, flash cookie, web beacon, session cookie, persistent cookie, or similar storage.

Figure 1:
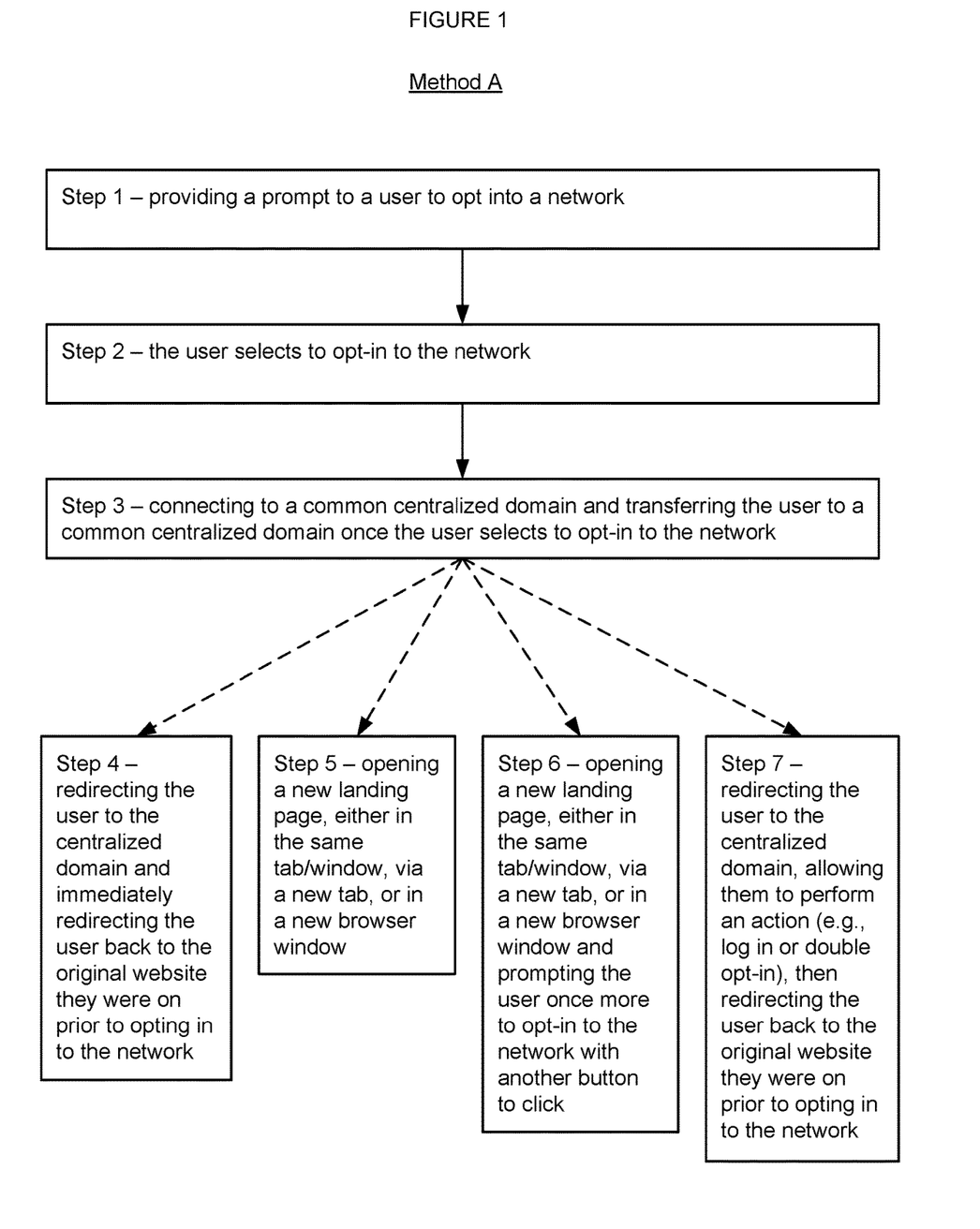
FIG. 1 illustrates a block diagram that illustrates a flowchart for a method of providing a cross-site network.
Figure 2:
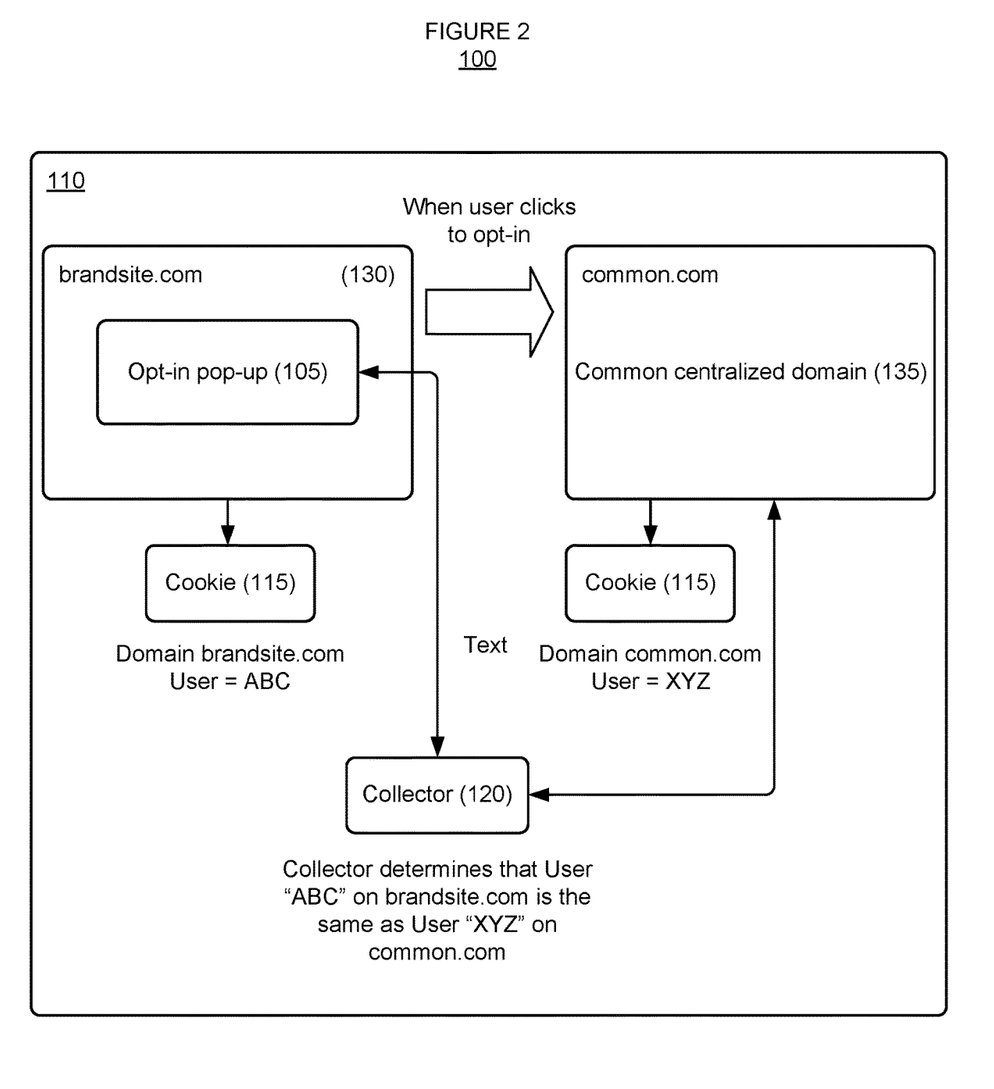
FIG. 2 depicts an example of a system for tracking a user across multiple website domains over a computerized network.

Turning to the drawings, FIG. 1 illustrates an exemplary embodiment of a method (Method A) for providing a cross-site network in a networked environment. A user as discussed herein may refer to computing device and/or an operator of the computing device. The actions performed by the user may be performed automatically by a computing device without input from an operator or may be performed based on input from an operator. In some embodiments, only a portion of the steps of Method A may be used, and in the same or other embodiments, the order of each step may be changed. In many embodiments, Method A can comprise a step 1 of providing a prompt to a user to opt into a computerized network. It is to be understood that any or all of the functions described herein may be performed by a server or by one or more other computerized devices in a networked configuration which comprise one or more processors and one or more memory modules. In some embodiments, the prompt can be similar to prompt 105 (FIG. 2). In some embodiments, the prompt can be part of another process on the website. As non-limiting examples, the prompt may be by non-limiting example, an authentication link (e.g., "log in") that prompts the user to log into a user account on one or more web sites, embedded as part of an OAuth process with another domain or included with other user consents (e.g., allowing one or more cookies). In some embodiments, the prompt may comprise a request for the user to accept one or more cookies, a pop-up modal, tab, or window that prompts the user to join a newsletter or mailing list, a pop-up modal, tab, or window that prompts the user to join a community on one or more websites, a link that prompts the user to complete a common action on one or more websites such as creating an account, or a pop-up modal, tab, or window that offers the user a promotional offer or discount code in response to the user responding by entering an email address or clicking a prompt response button such as by non-limiting example "yes". The prompt can be provided by a script. In many embodiments, step 1 can further comprise providing a prompt to inform the user of the option to opt-in to the network. The prompt can be displayed on a webpage or in an application when the user visits a brand's website. The prompt can be presented as at least one of a popup, slide-out from any side of the user's screen or the webpage, in-line with the content of the webpage or screen (e.g., in the navigation), or on a banner or other similar presentation. The prompt provided in step 1 can present the user with an option to opt in to tracking within the network via options to "accept", "opt-in", "join", "log in", "sign up", or any other messaging and which requires user interaction (e.g., a click or selection) to continue. In some embodiments, the prompt may be implied as part of another action the user may take, such as an authentication or "log in" event, a request to join a mailing list and enter an email address or other identifying information, receive a coupon or promotional discount code, or as part of another consent prompt on the page (e.g., asking the user to accept cookies or terms of use), or in response to the user exiting the user prompt such as by non-limiting example, closing a pop-up window or other user prompt.

In some embodiments, in response to the user prompt, the user may provide a user input comprising at least one of the following: an affirmative input or action by the user to accept one or more cookies, join a newsletter or mailing list, join a community, or begin a prompted process; an email address of the user; a click of "yes" in response to the prompt; and a closing of the pop-up modal, tab, or window that provided the user prompt.

In some embodiments, the prompt presented in step 1 can be served via a script from a subdomain of a brand. In some embodiments, the script can be part of a tracking code as taught in U.S. Pat. No. 11,170,066, entitled "Systems and Methods for Personalization of Digital Displayed Media" issued on Nov. 9, 2021, and which is incorporated in its entirety herein. As a non-limiting example, in some embodiments, if a user is on www.brandsite.com, the script may be served from any subdomain. For example, persosa-.brandsite.com.

In some embodiments, Method A can determine if the user has an existing user identity by analyzing first-party user identifier such as a cookie stored in the user's browser, and if found, the user identity is re-used. A cookie can be a first party cookie created by the website or host domain that the user visits. If the method determines that the user does not have a user identity stored in a cookie, a user identity is generated by the method. In some embodiments, the user identity is generated as taught in U.S. Pat. No. 11,170,066, entitled "Systems and Methods for Personalization of Digital Displayed Media" issued on Nov. 9, 2021, and which is incorporated in its entirety herein. In some embodiments, the user identity is a randomly generated identifier.

In some embodiments, the first-party user identifier is stored in a cookie. In most embodiments, the cookie is a first-party cookie set in the user's browser under the brand's domain as shown by the exemplary embodiment of a cookie 115 provided in FIG. 2. This cookie may be created in a "Set-Cookie" header of an HTTP response or on the webpage via code running on the page (e.g., Javascript). In some embodiments, the cookie may only be available through one or more HTTP or HTTPS requests. In the same or other embodiments, the cookie may be available to code on the page (e.g., Javascript). In some embodiments, the cookie may be made available in secure or insecure contexts (HTTP or HTTPS). In some embodiments, the cookie may be made available on certain domains or sub-domains of the brand's domain. In some embodiments, the cookie may be made available only on certain pages on the brand's site (for example, the contact page, but not the home page). In some embodiments, the first-party user identifier may comprise at least one of the following: information about a web browser used by the user, a user identity for the user associated with one or more websites, an IP address of the user, a user-agent of the web browser of the user, a webpage visited by the user, a query parameter in a URL visited by the user, and a code that is unique to at least one of the user and a current web browsing session of the user.

In some embodiments, the prompt is only displayed if the user has not previously opted into the network. In the same or other embodiments, other configurable logic is deployed to determine if the prompt should be presented to the user. In some embodiments, the configurable logic can be based on user behavior (e.g., first time visitor vs returning visitor), geography (e.g., only show prompt for users in a defined territory), browser information (e.g., only show prompt for users on a specific browser such as by non-limiting example, Safari, but not any other browser), or any other known user information (e.g., only show to users who are known customers or not currently authenticated).

In some embodiments, the script on the page can send requests to a collector. The collector can be similar to collector 120 of FIG. 2. The collector can be a web service. The request can be of any type, including, but not limited to: HTTP/HTTPS request(s), websocket communications, a beacon request, loading of a sub-resource (e.g., another Javascript file or image). In many embodiments, the script can send requests to the collector at a regular interval (e.g. polling). As a non-limiting example, a regular interval can be once every second or once every 250 milliseconds. In some embodiments, the regular interval can be between 200 milliseconds and two seconds. In some embodiments, the script can send requests to the collector on a user event, such as, by non-limiting example, every time the visitor navigates to a new page. Providing requests at a regular interval can allow the collector 120 to determine if there is an active user that may potentially opt in to the network. Providing requests at regular intervals can allow the system to more quickly detect when a user is no longer active on the page. The closer the regular intervals are to each other, the quicker an inactive user can be determined. In some embodiments, the request to the collector 120 may include a code that is unique to the user and/or to the user's web browsing session. In some embodiments, the request to the collector 120 may include the unique identifier (i.e., the value stored in the cookie) that is unique to the user and/or to the user's session such as by non-limiting example, information about the user's web browser or the user's IP address. In some embodiments, the request to the collector 120 may include an encrypted or hashed version of the unique identifier for the user and/or the user's session. In the event the user dismisses the prompt, the script on the page can send a request to the collector 120 to indicate that the user has abandoned the opt-in process. In some embodiments, an action by the user (e.g., dismissing the prompt) can be tracked by collector 120 and, in some embodiments, a user action or abandonment can trigger a different prompt during the user's next visit. This also can be configurable logic as described above.

In many embodiments, a method further can comprise a step 2 of the user selecting to opt-in to the network. In some embodiments, when the user selects to opt-in to the network, a script on the brand site can send a request to the collector. This request indicates that the user has opted-in and is being transferred to the central domain. The request itself can be of any type, including, but not limited to: HTTP/HTTPS request(s), a websocket communication, a beacon request, or loading of a sub-resource (e.g., another Javascript file or image). In some embodiments, the request to the collector 120 may include a code that is unique to the user and/or to the user's session. In some embodiments, the request to the collector 120 may include the unique identifier (i.e., the value stored in the cookie) that is unique to the user and/or to the user's session. In some embodiments, the request to the collector 120 may include an encrypted or hashed version of the unique identifier for the user and/or the user's session.

In some embodiments, when the user selects to opt-in to the network, the user is taken to another page on the tracking subdomain that's part of the brand site (e.g., persosa.brand- .com/redirect). While this page is loading, a request is made to the collector indicating that the user has opted-in and is being transferred to the central domain.

In some embodiments, when the user selects to opt-in to the network, the script on the page can stop sending requests at regular intervals to the collector. If the script on the page had been sending requests at a regular interval, this process of sending requests is abandoned. This halt of requests, combined by a lack of an abandonment request, may inform the collector that the user has chosen to move forward in the opt-in process. In some embodiments, the halt of requests combined with a lack of an abandonment request may mean that the user closed the tab or window (e.g., the browser tab).

In some embodiments, when the user closes a tab prior to opting into the network, the script on the page can stop sending requests at regular intervals to the collector. In the same or other embodiments, when the user closes a tab prior to opting into the network, the script on the page can send a request to the collector, prior to the tab closing, telling the collector that the opt-in process is being abandoned.

In many embodiments, a method further can comprise a step 3 of connecting to a common centralized domain. Step 3 comprises transferring the user to a common centralized domain 135 (FIG. 2) once the user selects to opt-in to the network. The common centralized domain can be a webpage on a common, centralized domain (e.g., common.com). As an example, if brandA.com and brandB.com are two separate websites on the network, they would both forward users wishing to opt-in to a common centralized domain (e.g., common.com). As such, the common centralized domain is common across websites and is central to the tracking network. When the page on the centralized domain is loading, the page either uses an existing user identifier found in a first party cookie on the centralized top-level domain (e.g., common.com) or creates a new user identity to be associated to that user in the context of the common centralized domain.

The user identification (ID) is stored in a cookie, which can be a first party cookie, set in the user's browser under the centralized top-level domain (e.g. common.com). This cookie may be set in the "Set-Cookie" header of the response or on the page via a script. In some embodiments, the cookie may only be available through HTTP/HTTPS requests (in some embodiments using the HttpOnly property) or may be made available to scripts on the page. In some embodiments, the cookie may be made available in secure or insecure contexts (HTTP or HTTPS). In some embodiments, the cookie may be made available on certain domains or sub-domains of the brand's domain. In some embodiments, the cookie may be made available on certain pages on the brand's site (for example, the contact page, but not the home page).

In some embodiments, server-side code can make a call to the collector while the page on the common centralized domain is being loaded.

In some embodiments, code on the page on the common centralized domain can make a call to the collector. In some embodiments, the call to the collector is only made when the user clicks a button (e.g., a confirmation button) on the page, thus completing a double opt-in process. The button can be a confirmation button on the centralized domain if the brand wishes to use a double opt-in process. In some embodiments, after the user clicks to opt-in from the prompt on the brand's site, they can be redirected to the common site. On that common site, the button can be displayed and the user is not opted-in until he or she clicks the button.

In various embodiments, data is passed to the page on the centralized domain via the URL, either in a direct path (e.g., common.com/some/data or common.com/some-data), via a subdomain (e.g., somedata.common.com), a query parameter (e.g., common.com?some=data), or a page fragment (e.g., common.com#some-data), or a combination any of the aforementioned methods. This data may include a user identifier, a one-way hash of a user identifier, an encrypted version of the user identifier, or some other data that allows the collector to uniquely identify the user or user session performing the opt-in.

In various embodiments, data is passed to the page on the centralized domain via the HTTP/HTTPS body, such as in an HTTP POST or HTTPS POST request. This data may include a user identifier or some other data that allows the collector to uniquely identify the user performing the opt-in (e.g., hashed or encrypted version of the user identifier).

In some embodiments, the method can comprise at least one of step 4, step 5, step 6, or step 7 as shown in FIG. 1. Step 4 comprises redirecting the user to the centralized domain and immediately redirecting the user back to the original website they were on prior to opting in to the network. Redirecting may comprise navigating a user to a website/webpage in a user's current window and tab of the user's web browser, in a new window of the user's web browser, in a new tab within the current window of a user's web browser, in an embedded iframe within a current webpage, or via a notification on a second computerized device of the user that prompts the user to open a webpage in a browser on the user's second computerized device. Step 5 comprises opening a new landing page, either in the same tab/window, via a new tab, or in a new browser window. Step 6 comprises opening a new landing page, either in the same tab/window, via a new tab, or in a new browser window and prompting the user once more to opt-in to the network with another button to click. Step 7 comprises redirecting the user to the centralized domain, allowing the user to perform an action (e.g., log in or double opt-in), then redirecting the user back to the original website the user was on prior to opting in to the network. Redirecting may comprise navigating a user to a website/webpage in a user's current window and tab of the user's web browser, in a new window of the user's web browser, in a new tab within the current window of a user's web browser, in an embedded iframe within a current webpage, or via a notification on a second computerized device of the user that prompts the user to open a webpage in a browser on the user's second computerized device.

In some embodiments, the prompt of Method A may be embedded as part of another process or sequence of user actions with or without a separate prompt. In the same or other embodiments, Method A may be embedded as part of another process or sequence of user actions. As non-limiting examples, Method A may be embedded into an authentication (e.g., log in) process, embedded as part of an OAuth process with another domain, or included with one or more other user consents (e.g., allowing cookies).

FIG. 2 illustrates a system 100 for a cross-site network 110. System 100 comprises a collector 120. Collector 120 is a service that receives requests from both the brand site and the common centralized domain in order to make a decision about which user identities to link. In some embodiments, collector 120 can link a user identity from a brand site 130 to a user identity on a common domain 135. As a non-limiting example, if collector 120 determines that a user A on the brand site is the same as a user B on the common centralized domain, it will then pass that recognition along to the brand site and/or the common centralized domain that user A and user B are actually the same user. Collector 120 allows cross-site network 110 to assume that a user seen on a brand site 130 is the same user seen on the common domain 135.

As described in Method A, collector 120 can receive and process requests from one or more sources. One or more sources may send one or more requests during the opt-in process on a brand's site while the user is prompted and the collector 120 is receiving requests at regular intervals, during the opt-in process if or when a user chooses to opt-in and continue to the next step, during the opt-in process if/when the user chooses to abandon the opt-in process, after the user clicks to opt-in and is redirected through a page on the brand's site, after the user clicks to opt-in and is taken to centralized domain 135 via one of the methods above, after the user clicks to opt-in, is taken to a centralized domain 135 via one of the methods above, and clicks a button to confirm, or by any other external application that sends data to the collector, including, but not limited to any other server to server process that may send data into collector 120 that can be used to determine if what appear to be distinct users are actually the same user. Redirecting may comprise navigating a user to a website/webpage in a user's current window and tab of the user's web browser, in a new window of the user's web browser, in a new tab within the current window of a user's web browser, in an embedded iframe within a current webpage, or via a notification on a second computerized device of the user that prompts the user to open a webpage in a browser on the user's second computerized device.

A request to collector 120 can include information about the user, the user's browser, or the user's session. As a non-limiting example, the request can comprise any information that is accessible about the user's browser (e.g., window size or screen resolution), the user identity for the user within the context of a specific domain, the user's IP address, the user's browser's user-agent, the domain the user is visiting (e.g., brandsite.com), or a code unique to the user and/or the user's current session. Any information provided can be passed in the body of the request, via an existing cookie set in the user's browser, via an HTTP/HTTPS header, in a query string, or by any other means.

Collector 120 can track how many users are active in the opt-in process by analyzing one or more unique combinations of user or browser information, which may include as non-limiting examples, one or more of the following: (1) domain the user is visiting (e.g., brandsite.com); (2) page on the domain the user is visiting (e.g., brandsite.com/somepage) (3) IP address of the user; (4) other available identifiers of the user, the user's browser, information accessible about the user's browser or the user's session, including, but not limited to the browser's user-agent (the "browser identifier"); (5) unique user identity; (6) a timestamp associated with the current session, including, but not limited to when the collector began tracking the user or the timestamp of the most recent request sent to the collector; (7) the interval at which requests are being made to the collector; (8) a confirmation code returned from a previous request to the collector; or (9) other identifier (e.g. a unique code) unique to a user and/or their current session. Using the one or more unique combinations, collector 120 can determine the number of unique users that are active and/or potentially about to opt-in to a site at any given time.

If the collector 120 receives a request that the user is abandoning the opt-in process, it will remove its brand user identity from consideration and will not link it to any user identity on the centralized domain 135.

When the collector 120 receives a request from the centralized domain 135, the collector 120 determines how many users are pending opt-in on that associated brand site by analyzing how many active users have the same of any combination of user or browser information, which may include as non-limiting examples one or more of the following: (1) a domain the user is visiting (e.g., brandsite.com); (2) an IP address of the user; (3) other available identifiers of the user, the user's browser, or the user's session, including, but not limited to the browser's user-agent (the "browser identifier"); (4) a unique user identity; (5) a timestamp associated with the current session, including, but not limited to when the collector began tracking the user or the timestamp of the most recent request sent to the collector; (6) the interval at which requests are being made to the collector; (7) a confirmation code returned from a previous request to the collector; or (8) another identifier (e.g. a unique code) unique to a user and/or their current session. A non-exhaustive list of potential outcomes includes:

1. If a unique code, identifier, encrypted unique code or identifier, or one way hash of a unique code or identifier is provided as part of Step 1 (FIG. 1) or Step 2 (FIG. 1) and that same code/identifier/hash is passed to the centralized domain as part of Step 3 (FIG. 1), the collector 120 may link the user identities from the brand site and centralized domain 135 that share the same code.

2. If only a single user is pending activation on the site, the collector 120 may link the user identity for the user on the brand site to the user identity for the user on the centralized domain 135.

3. There may be multiple matching pending opt-ins (which may include as non-limiting examples one or more of the following (1) a domain the user is visiting (e.g., brandsite.com); (2) an IP address of the user; (3) other available identifiers of the user, the user's browser, or the user's session, including, but not limited to the browser's user-agent (the "browser identifier"); (4) a unique user identity; (5) a timestamp associated with the current session, including, but not limited to when the collector began tracking the user or the timestamp of the most recent request sent to the collector; (6) the interval at which requests are being made to the collector; (7) a confirmation code returned from a previous request to the collector; or (8) other identifier (e.g. a unique code) unique to a user and/or their current session), but only a single user has clicked to opt-in since the collector 120 request has been received from the centralized domain 135. In this case, network 110 will link that user identity to the user identity seen on the centralized domain 135.

4. There may be multiple matching pending opt-ins (which may include as non-limiting examples one or more of the following (1) a domain the user is visiting (e.g., brandsite.com); (2) an IP address of the user; (3) other available identifiers of the user, the user's browser, or the user's session, including, but not limited to the browser's user-agent (the "browser identifier"); (4) a unique user identity; (5) a timestamp associated with the current session, including, but not limited to when the collector began tracking the user or the timestamp of the most recent request sent to the collector; (6) the interval at which requests are being made to the collector; (7) a confirmation code returned from a previous request to the collector; or (8) another identifier (e.g. a unique code) unique to a user and/or their current session), but only a single user has not clicked to opt-out since the collector 120 request has been received from the common domain. In this case, network 110 will link that user identity to the user identity seen on the centralized domain 135.

5. There may be multiple matching pending opt-ins and multiple users have clicked to opt-in since this request was received. Based on the timestamps of when each user clicked to opt-in, the collector 120 may choose to link the user identity of the earliest user. In another embodiment, if the time differences are shorter than a predetermined length of time, the collector 120 may choose to ignore this request and not link the user at all.

6. The collector 120 may delay this request for a future time to see if any of the other active users abandon or opt-in, therefore further refining the list of potential users to link.

Any of the above outcomes may be evaluated at once. More than one may be implemented at the same time to further reduce the pools of potential users to link.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

In places where the description above refers to particular implementations of systems and methods for tracking a user across multiple website domains over a computerized network it should be readily apparent that a number of modifications may be made without departing from the spirit thereof and that these implementations may be applied to other to systems and methods for user tracking.

We claim:

1. A computing system for tracking a user across multiple web site domains over a computerized network, the system comprising:
   one or more hardware computer processors; and
   one or more storage devices configured to store software instructions executable by the one or more hardware computer processors to cause the computing system to:
      send a first first-party user identifier to a collector in response to a user accessing a first website;
      generate a first user prompt in response to the user accessing the first website;
      receive a first input from the user in response to the first user prompt;
      redirect the user to a centralized domain;
      send a second first-party user identifier associated with the user and the centralized domain to the collector;
      correlate the first first-party user identifier with the second first-party user identifier to determine that the user is associated with both the first first-party user identifier and the second first-party user identifier; and
      display a webpage of the centralized domain or a landing page in response to the correlation,
   wherein the one or more storage devices are further configured to store software instructions executable by the one or more hardware computer processors to cause the computing system to determine by the collector whether there is an active user having an ability to opt into the computerized network via a user prompt by sending one or more requests to the collector at predetermined intervals of time.

2. The computing system of claim 1, wherein the first first-party user identifier comprises at least one of:
   information about a web browser used by the user;
   a user identity for the user associated with the first website;
   an IP address of a computerized device used by the user;
   a user-agent of the web browser of the user;
   a webpage visited by the user;
   a query parameter in a URL visited by the user;
   a domain visited by the user; and
   a code that is unique to at least one of the user and a current web browsing session of the user.

3. The computing system of claim 1, wherein the user prompt comprises at least one of:
   an authentication link that prompts the user to log into a user account on the first website;
   a request for the user to accept one or more cookies;
   a pop-up modal, tab, or window that prompts the user to join a newsletter or mailing list;
   a pop-up modal, tab, or window that prompts the user to join a community on the first web site;
   a link that prompts the user to complete a common action on the first website; and
   a pop-up modal, tab, or window that offers the user a promotional offer or other discount code in response to the user providing the first input.

4. The computing system of claim 1, wherein the first user input comprises at least one of:
   an affirmative input or action by the user to accept one or more cookies;
   an affirmative input or action by the user to join a newsletter or a mailing list;
   an affirmative input or action by the user to join a community;
   an affirmative input or action by the user to begin a prompted process;
   an email address of the user;
   a click of "yes" in response to the first user prompt; and
   a closing of the pop-up window of the first user prompt.

5. The computing system of claim 4, wherein the one or more storage devices are further configured to store software instructions executable by the one or more hardware computer processors to cause the computing system to:
   generate a second user prompt after the user is redirected to the centralized domain; and
   receive a second input from the user in response to the second user prompt.

6. The computing system of claim 4, wherein the one or more storage devices are further configured to store software instructions executable by the one or more hardware computer processors to cause the computing system to redirect the user back to the first website.

7. The computing system of claim 1, wherein the one or more requests sent to the collector may comprise at least one of:
   a code associated with the user or a web browsing session of the user;
   information about a web browser used by the user;
   an IP address of the user; and
   a unique identifier associated with the user.

8. The computing system of claim 1, wherein the one or more requests sent to the collector may comprise an indication that the user has chosen not to respond to the first user prompt in response to a dismissal of the first user prompt by the user.

9. The computing system of claim 1, wherein the one or more storage devices are further configured to store software instructions executable by the one or more hardware computer processors to cause the computing system to display a different user prompt when the user next visits the first website in response to the first user input or the prior abandonment of the first user prompt by the user.

10. A method for tracking a user across multiple website domains over a computerized network, the method comprising:
   sending a first first-party user identifier to a collector in response to a user accessing a first web site;
   generating a first user prompt in response to the user accessing the first website;
   receiving a first input from the user in response to the first user prompt;
   redirecting the user to a centralized domain;
   sending a second first-party user identifier associated with the user and the centralized domain to the collector;
   correlating the first first-party user identifier with the second first-party user identifier to determine that the user is associated with both the first first-party user identifier and the second first-party user identifier;
   displaying a webpage of the centralized domain or a landing page in response to the correlation;
   determining by the collector whether there is an active user having an ability to opt into the computerized network via a user prompt by sending one or more requests to the collector at predetermined intervals of time.

11. The method of claim 10, wherein the first first-party user identifier comprises at least one of:
   information about a web browser used by the user;
   a user identity for the user associated with the first website;
   an IP address of the user;
   a user-agent of the web browser of the user;
   a webpage visited by the user;
   a query parameter in a URL visited by the user;
   a domain visited by the user; and
   a code that is unique to at least one of the user and a current web browsing session of the user.

12. The method of claim 10, wherein the user prompt comprises at least one of:
   an authentication link that prompts the user to log into a user account on the first website;
   a request for the user to accept one or more cookies;
   a pop-up modal, tab, or window that prompts the user to join a newsletter or mailing list;
   a pop-up modal, tab, or window that prompts the user to join a community on the first website;
   a link that prompts the user to complete a common action on the first; and
   a pop-up modal, tab, or window that offers the user a promotional offer or other discount code in response to the user providing the first input.

13. The method of claim 10, wherein the first user input comprises at least one of:
   an affirmative input or action by the user to accept one or more cookies;
   an affirmative input or action by the user to join a newsletter or a mailing list;
   an affirmative input or action by the user to join a community;
   an affirmative input or action by the user to begin a prompted process an email address of the user;
   a click of "yes" in response to the first user prompt; and
   a closing of the pop-up window of the first user prompt.

14. The method of claim 13, further comprising:
   generating a second user prompt after the user is redirected to the centralized domain; and
   receiving a second input from the user in response to the second user prompt.

15. The method of claim 13, further comprising redirecting the user back to the first website.

16. The method of claim 10, wherein the one or more requests sent to the collector may comprise at least one of:
   a code associated with the user or a web browsing session of the user;
   information about a web browser used by the user;
   an IP address of a computerized device used by the user; and
   a unique identifier associated with the user.

17. The method of claim 10, wherein the one or more requests sent to the collector may comprise an indication that the user has chosen not to respond to the first user prompt in response to a dismissal of the first user prompt by the user.

18. The method of claim 10, further comprising displaying a different user prompt when the user next visits the first website in response to the first user input or the prior abandonment of the first user prompt by the user.

\* \* \* \* \*